Figure 1:
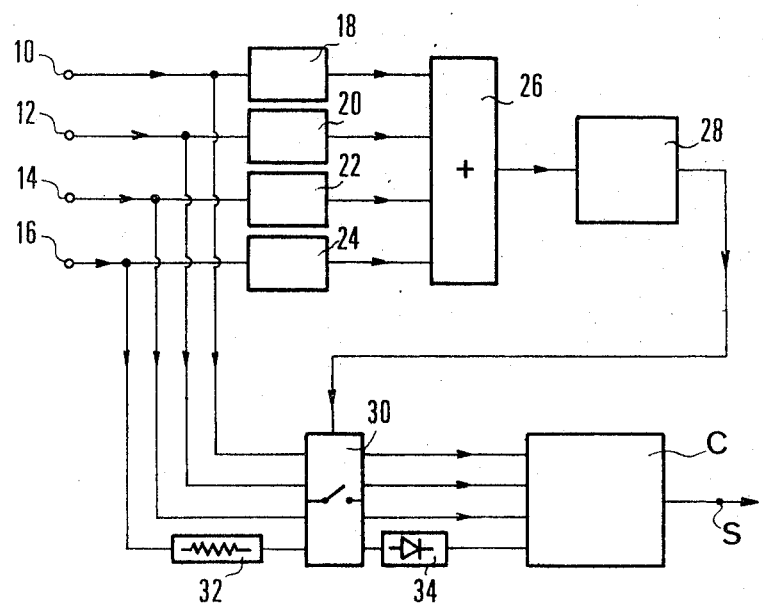

United States Patent [19]
Lefevre et al.

[11] 3,839,643
[45] Oct. 1, 1974

[54] MONITORING AND PROTECTING DEVICE FOR AN ANTISKID FUNCTIONAL CIRCUIT ASSEMBLY

[75] Inventors: Jean-Pierre Lefevre, Montreuil; Bernard Vermillet, Pierrefitte, both of France

[73] Assignee: Societe Anonyme D.B.A., Paris, France

[22] Filed: June 13, 1973

[21] Appl. No.: 369,684

[30] Foreign Application Priority Data
June 21, 1972  France ............................ 72.22295

[52] U.S. Cl. ........ 307/10 R, 307/233 B, 303/21 AF, 317/5, 340/53
[51] Int. Cl. ............................................. B60t 8/10
[58] Field of Search .................. 328/150, 154, 158; 307/235, 233, 242, 243, 10 R; 340/53; 303/21 AF

[56] References Cited
UNITED STATES PATENTS

| | | |
|---|---|---|
| 3,230,462 | 1/1966 | Kohl .................................. 328/150 |
| 3,292,150 | 12/1966 | Wood ............................. 307/243 X |
| 3,489,920 | 1/1970 | Moore et al. .................... 328/150 X |
| 3,586,877 | 6/1971 | Aridas ............................. 307/243 X |

Primary Examiner—John S. Heyman
Attorney, Agent, or Firm—Ken C. Decker; William N. Antonis

[57] ABSTRACT

A monitoring and protecting device for an antiskid functional circuit assembly responsive to the variations in one or more electrical input signals and supplying at least one output signal in response to given values of the variations, the device comprising filter means, a summation means, a threshold means, and at least one blocking element, arranged in that order. Each filter means being supplied by one input signal and passing given fraction of this signal. The summation means supply the threshold means with the sum of this fractions, for blocking transmission to the assembly of at least one input signal when the sum is greater than or equal to a given threshold.

7 Claims, 2 Drawing Figures

PATENTED OCT 1 1974 3,839,643

MONITORING AND PROTECTING DEVICE FOR AN ANTISKID FUNCTIONAL CIRCUIT ASSEMBLY

The invention relates to a monitoring and protecting device for an antiskid functional circuit assembly and more particularly to a device of this kind for a functional circuit assembly responsive to the variations in one or more electrical input signals and supplying at least one output signal in response to given values of the variations.

In functional circuit assembly of this type, random interference signals superimposed on the input signals very often prevent the assembly from working properly. Since such interference cannot generally be eliminated by acting on its causes, a functional circuit assembly very frequently needs a monitoring and protecting device to prevent the interference from affecting it.

The invention proposes a monitoring and protecting device for an antiskid functional circuit assembly as hereinabove defined, wherein said device comprises one or a plurality of filter elements, each supplied with one of the input signals and preferentially passing given fractions passed by the filter elements and supplying a signal representing the sum of the given fractions, at an instant, a threshold element responsive to a given threshold of the sum to operate at least one blocking element situated at the entrance to the functional circuit assembly, said blocking element blocking transmission to this assembly of at least one of the input signals when said sum is greater than or equal to said given threshold.

In a preferred embodiment of this invention, the electrical input signals represent the speed of at least one wheel and/or the potential of the power supply of at least one part of the functional circuit assembly.

In another embodiment of the invention, the given fractions of the variations comprise the random interference superimposed on said input signals.

In still another embodiment of the invention, the summation element is a weighted summation element supplying a signal representing the weighted sum of the given fractions.

According to the invention, when the input signals include the potential of the power supply, generally the storage battery of the vehicle, they are filtered to supply the weighted summation element with a fraction of said input signals comprising the random interference signals. The summation element is weighted for permitting to accord a relative wanted level for each input signal, for example to accord a greater level to the input speed signals of the front wheel than to the input speed signals of the rear wheel. The signal supplied by the summation element is compared in a threshold element to a predeterminate threshold above which the functional circuit assembly would risk to supply inappropriate signals to release the braking force which would be only produced by the random interference signals. According to the invention, when the sum signal is greater than or equal to said given threshold, the blocking element blocks transmission of one or many input signals to the functional system, thus avoiding output signals produced by the random interference signals, thereby avoiding undesired release of the brakes.

Figure 2:
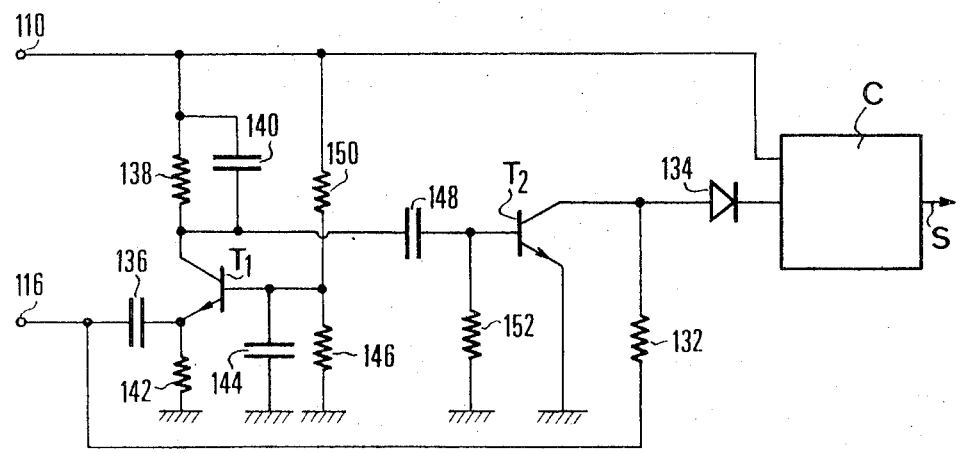

The invention will now be described with reference to the accompanying drawings in which:

FIG. 1 shows a sketch of a monitoring and protecting device embodying the invention, for an antiskid functional circuit assembly receiving four input signals, and FIG. 2 shows a particular embodiment of a device according to the invention for a functional antiskid circuit assembly supplied with two input signals.

In FIG. 1, an antiskid functional circuit assembly C is supplied by four electrical input signals 10, 12, 14, 16. The input signals 10, 12, 14, 16 are coming from four wheel speed sensing circuits (not shown). The assembly of any known type, is adapted to provide an output signal at S in response to given values for the variations in the input signals. The monitoring and protecting device embodying the invention comprises four filter elements 18, 20, 22 and 24 connected in parallel to the input signals 10, 12, 14 and 16 respectively. The output terminals of these filter elements 18, 20, 22, 24 are connected to a weighted summation element 26, whose output signals represents the weighted sum, possibly analogue, of the output signals from the filter elements. A threshold element 28 receives the output signal from the summation element 26 and, when the value of this sum signal passes a predetermined threshold, operates a blocking element 30, which is situated at the entrance to the functional circuit assembly C and which is associated with all the input signals, or at least one of them according to the needs of the manufacturer. For example, it will be supposed that the blocking element 30 operates the input signal 16.

In this case, on the line connecting the input terminal 16 to the functional circuit assembly C, an attenuator 32 and a unidirectional transmission element 34 are provided on opposite sides of the blocking element 30, upstream and downstream of this element respectively.

The device shown in FIG. 1 operates as follows.

The input signals 10, 12, 14 and 16 would be fed direct to the circuit assembly C if the device embodying the invention were not present. Random interference signals are frequently superimposed on the input signals and would prevent the circuit assembly C from working properly, for example by making it supply output signals at S when the functional variations in the input signals 10, 12, 14 and 16 proper are such that they should not give rise to any output signal.

When such interference signals appear in the input signals 10, 12, 14 and 16, however the filter elements 18, 20, 22, 24 separate them from their respective basic input signals and send the weighted summation element 26 signals which represent the level of these interference signals at an instant. The summation element 26 therefore effects the weighted sum according to the needs of the system, possibly in analogue fashion, of the various interference signals superimposed on the input signals 10, 12, 14, 16, and it therefore delivers to the threshold circuit 28 a signal representing the weighted sum of the interference signals which are fed to the input signals 10, 12, 14, 16 of the circuit assembly C. When the value of the input to the threshold circuit 28 passes a predetermined threshold, the threshold circuit 28 operates the blocking element 30. The blocking element 30 therefore prevents transmission to the circuit assembly C of the input signal 16, for example. As a result the circuit assembly C is protected at the instant when these interference signals occur in the input signals 10, 12, 14 and 16 and does not produce spurious output signals as it would if unprotected.

According to this embodiment, the input signal 16, on which acts the blocking element 30, is transmitted to the circuit assembly C by way of an attenuator 32, the blocking element 30 and a unidirectional transmission element 34, arranged in series and in that order. Operation is then as follows. When the threshold circuit 28 detects a random signal level above its threshold it operates the blocking element 30, which interrupts direct transmission between the attenuator 32 and the unidirectional element 34. The input signal 16 therefore cannot be transmitted to the circuit assembly C until the level of the interference signals detected by the threshold element 28 has dropped back below the predetermined threshold. The unidirectional conducting element 34 and the attenuator 32 enable this interruption to be made by any means desired and also prevent the interruption from simultaneously reacting on the operation of the circuit assembly C and/or on the input signals 16 whose transmission is being interupted.

FIG. 2 illustrates a particular embodiment of a device according to the invention. In this embodiment the functional circuit assembly C, which is the logic calculating circuitry of an anti-skid brake circuit for at least one wheel of a vehicle (not shown), receives input signals 110 and 116. The input signal 110 corresponds to the potential of the power supply (generally the storage battery of the vehicle) which provides the anti-skid system with electrically, and the input signal 116 corresponds to the signal representing the speed of the wheel on which the anti-skid brake system acts. The circuit assembly C, which may be of any known type, responds both to those variations in the input signal 116 due to wheel speed variations and to the interference signals superimposed on this basic signal. In addition the circuit assembly C and the speed signal received at 116 respond to the random interfering variations superimposed on the direct-current voltage supplying the various electronic elements in the anti-skid brake system.

These various random interference signals risk to produce untimely operation of the responsive circuits in this assembly, leading to random generation of signals to relax the braking force acting on the wheel. In an extreme case it has been found that a succession of interference signals may prevent all braking of the wheel, due to the generation of a permanent "relax" signal at S.

In the circuit shown in FIG. 2, capacitors 140, 148 associated with resistors 138 and 152 constitute a filter element for the input signal 110, the filter element for the input signal 116 comprises a capacitor 136 and a resistance 142 and the weighted summation element being constituted by a transistor T1, biased between the power supply 110 and ground by resistances 150, 146 and by the resistances 138, 142. The base of the transistor T1 is decoupled with respect to earth by a capacitor 144 so that interference signals arriving at 110 and passing through the resistance 150 cannot be fed back through the transistor T1. The latter functions as a non-inverting amplifier and is operated through its emitter, that is to say, signals appearing at its collector are of greater amplitude then, but are in phase with the interference signals in the input signal 116 passing through the capacitor 136 and arriving at the emitter of the transistor T1. The threshold element and blocking element are in the form of a transistor T2 of which the base is connected to the output of the capacitor 148, the emitter is grounded and the connector is connected to the input terminal 116 by way of the attenuator which is in the form of a resistance 132. Lastly the unidirectional transmission element is in the form of a diode situated between, firstly, the point connecting the resistance 132 and the collector of the transistor T2 and, secondly, the corresponding input terminal of the circuit assembly C.

Operation of the circuit shown in FIG. 2 is essentially the same as that of the more diagrammatic circuit shown in FIG. 1. During normal operation the input signal 110 is comming from one terminal of an electricity supply (storage battery) and therefore supplies a continuous basic signal on which random interference voltages are superimposed. The input terminal 116 is connected to a wheel speed sensing circuit (not shown), so that it sends to the circuit assembly C a pseudocontinuous or relatively slowly varying signal on which random interference signals at much higher frequencies are superimposed. This random interference superimposed on the input signals 110 and 116, although of low amplitude compared with these basic input signals, being directly injected, risk to produce untimely operation of the circuit assembly C and therefore the appearance at S of signals to relax the braking force acting on the wheel, possibly making it completely impossible to brake this wheel. The circuit shown in FIG. 2 makes it possible to overcome these disadvantages because the random interference signals, when they come from the input 110 by way of the capacitors 140, 148 or from the input 116 by way of the capacitor 136, transistor T1 and capacitor 148, are fed together to the base of the transistor T2, which acts as both a threshold element and a blocking element simultaneously. This is because, when the interference signal transmitted by the capacitor 148 to the base of the transistor T2 exceeds a given value, the transistor T2 turns on and therefore changes the potential of its collector to a value close to that of ground. The speed signal applied to the input 116 and traversing the resistance 132 is therefore short-circuited before being transmitted to the circuit assembly C. The diode 134 prevents certain electronic elements in the circuit assembly C, particularly memory capacitors from discharging to the transistor T2 while the latter is on.

As a result, as soon as interference signals of sufficient amplitude to cause faulty operation of the circuit assembly C appear at the inputs 110 and/or 116 of the device, the transistor T2 switches and cuts the circuit assembly C off from the input signal 116, so preventing this assembly C from supplying a signal to relax the braking force, which at this time would be inappropriate and dangerous.

Advantages of the device shown in FIG. 2 include its very simple design and very rapid action. The blocking of the speed signal 116 by the transistor T2 in fact takes place while the interference signals are present, except for the actual switching time. With a device embodying the invention the circuit assembly C is protected from the various sort of electrical noise deriving from the electricity supply or from equipment and motors connected to this supply and also from radio or electromechanical noise of whatever origin.

Obviously, the invention is not restricted to the embodiments illustrated, but covers all modifications and adaptations within the scope of the appended claims.

In particular, it should be emphasized that the input signals may be of any number and that the action of the blocking element may be modified according to the particular functional conditions of the circuit assembly C.

I claim:

1. In an antiskid system for a wheeled vehicle including logic means responsive to a plurality of input signals for generating an output signal when an incipient skidding condition of a vehicle wheel exists, a monitoring and protecting device comprising:
   filter means responsive to each of said input signals for separating an interference signal from each of said input signals;
   summation means connected to said filter means for generating a summation signal proportional to the sum of the values of said interference signals;
   threshold means connected to said summation means for comparing said summation signal with a reference signal having a predetermined value and generating a threshold signal when the summation signal exceeds the reference signal; and
   blocking means having inputs for each of said input signals, and an output connected to said logic means corresponding to each of said inputs, said blocking means including means connected to said threshold means and responsive to said threshold signal for blocking at least one of said input signals between said input and output upon generation of said threshold signal.

2. The invention of claim 1:
   power supply means for operating said logic means;
   one of said input signals representing the voltage level of the power supply, each of the other signals representing the rotational velocity of at least one vehicle wheel.

3. The invention of claim 2:
   said signal to be blocked being one of the signals representing the rotational velocity of at least one vehicle wheel.

4. The invention of claim 2:
   said summation means comprising at least one transistor biased between said power supply means and grounded by resistance means, a capacitor connected between the base of said transistor and ground, the emitter of said transistor being connected to the input receiving an input signal representing the rotational velocity of at least one vehicle wheel, the collector of said transistor being connected to the input receiving the input signal representing the voltage level of the power supply means.

5. The invention of claim 1; and
   an attenuator connected to the inputs of the blocking means receiving the signals to be blocked and an unidirectional transmission element connected to the outputs corresponding to the last-mentioned inputs.

6. The invention of claim 5:
   said threshold means and the blocking means comprising at least one transistor, the base of said transistor receiving said summation signal, the emitter of said transistor being connected to ground, and the collector of said transistor being connected between said inputs and outputs carrying the signals to be blocked.

7. The invention of claim 6:
   said unidirectional element being a diode connected between the output carrying the signals to be blocked and said logic means to prevent the latter from discharging through said one transistor.

* * * * *